United States Patent [19]

Zang et al.

[11] Patent Number: 5,423,612

[45] Date of Patent: Jun. 13, 1995

[54] HYDRODYNAMIC BEARING AND SEAL

[75] Inventors: Yan Zang, Milpitas; Shuhao Chen, Fremont; Michael R. Hatch, Mountain View, all of Calif.

[73] Assignee: Quantum Corp., Milpitas, Calif.

[21] Appl. No.: 308,078

[22] Filed: Sep. 16, 1994

[51] Int. Cl.[6] .......................... F16C 32/06; F16C 33/72
[52] U.S. Cl. ...................................... 384/119; 384/132
[58] Field of Search ............... 384/119, 107, 132, 124, 384/100, 110

[56] References Cited

U.S. PATENT DOCUMENTS

| | | | |
|---|---|---|---|
| 3,325,231 | 6/1967 | Ono | 384/132 |
| 3,778,123 | 12/1973 | Hendler et al. | |
| 4,496,474 | 6/1986 | Van Roemburg | 384/114 |
| 4,614,445 | 9/1986 | Gerkema et al. | 384/132 X |
| 4,726,693 | 2/1988 | Anderson et al. | 384/114 |
| 4,795,275 | 1/1989 | Titcomb et al. | 384/107 |
| 4,892,418 | 1/1990 | Asada et al. | 384/124 |
| 5,067,528 | 11/1991 | Titcomb et al. | 141/4 |
| 5,112,141 | 5/1992 | Asada et al. | 384/100 |
| 5,112,142 | 5/1992 | Titcomb et al. | 384/107 |
| 5,145,266 | 9/1992 | Saneshige et al. | 384/132 X |
| 5,246,294 | 9/1993 | Pan | 384/119 |

Primary Examiner—Thomas R. Hannon
Attorney, Agent, or Firm—David B. Harrison

[57] ABSTRACT

A hydrodynamic bearing unit includes a shaft, a sleeve rotatably disposed over the shaft and defining a plurality of spaced-apart hydrodynamic journal bearings, an annular axial thrust plate secured to the shaft to form a shaft subassembly and having a first radial surface in facing confrontation with a shoulder of the sleeve and defining a first hydrodynamic thrust bearing, a thrust bushing secured to the sleeve to form a sleeve subassembly and having a bearing surface in overlying facing engagement with a second radial surface of the annular axial thrust plate to form a second hydrodynamic thrust bearing, a seal for hydrodynamic lubricant defined within an annular Vee groove located adjacent to the shaft and having an apex converging toward the second hydrodynamic thrust bearing, a motor for rotating the sleeve subassembly relative to the shaft subassembly, and hydrodynamic lubricant within the annular Vee groove, the lubricant being retained in place by capillary force in the absence of rotation, and by centrifugal force in the presence of relative rotation between the subassemblies. A secondary seal is also described.

20 Claims, 2 Drawing Sheets

HYDRODYNAMIC BEARING AND SEAL

REFERENCE TO RELATED PATENT APPLICATION

The present application is related to U.S. patent application Ser. No. 08/278,803, filed on Jul. 22, 1994, entitled Self-Contained Hydrodynamic Bearing Unit, the disclosure thereof being incorporated herein by reference.

SUMMARY OF THE INVENTION

The present invention relates to hydrodynamic bearings. More particularly, the present invention relates to a hydrodynamic bearing unit adapted for use within a rotating disk spindle of a hard disk drive wherein the unit manifests positive lubricant sealing by application of centrifugal and capillary forces.

BACKGROUND OF THE INVENTION

The development of computer hard disk drives demands ever increasingly higher track density, lower acoustic noise, and better reliability under shock and vibrational disturbances. The undesirable characteristics of the currently used ball bearing spindles, such as high non-repetitive runout, large acoustic noise, and high resonance frequencies due to bearing defect, impose severe limitation on the drive's capacity and performance.

The use of a non-contact bearing, such as a hydrodynamic bearing, may overcome the aforementioned limitation. The full film lubrication of a fluid bearing displays significantly lower non-repetitive runout and acoustic noise, and its higher damping provides better resistance to external shock and vibration.

The deployment of the hydrodynamic bearing system in a hard disk drive environment requires that the lubricant be securely sealed inside of the bearing structure under all operating and non-operating conditions in order to prevent performance degradation of the bearing and contamination in the drive. At the same time, the bearing system needs to be easily manufacturable in order to satisfy cost requirements.

Prior approaches in the design of lubricant seals for self-contained hydrodynamic bearing units include surface tension or capillary seals and/or traps, ferromagnetic seals, flow recirculation passages, spiral or herringbone pumping grooves and global flow recirculation of lubricant driven by the centrifugal force and pumping grooves resulting from relative rotation of the components comprising the bearing unit.

Capillary taper seals have been shown to be effective when the bearing unit is at rest. However, when capillary seals were used under dynamic operating conditions, flow passages or pressure ports had to be provided to balance overall seal pressure. These flow passages are difficult and expensive to manufacture, and their effectiveness diminishes when the size of the bearing unit (and thus the passages themselves) becomes smaller.

Ferromagnetic seals have proven to be vulnerable to leakage under thermal expansion conditions. On the other hand, pumping grooves have been shown to result in undesirable ingestion of ambient air during operation. Flow recirculation passages, either for localized lubricant flow, or for global flow throughout the structure of the bearing unit, involve considerable manufacturing difficulty and resultant high prime cost of the hydrodynamic bearing unit.

As the rotational speed of disk drive spindles increases, the centrifugal force exerted on the lubricant inside of the bearing unit increases, thereby overcoming surface tension of traditional outwardly-tapered capillary seals and resulting in lubricant being pumped out of the bearing unit and depleted.

A hitherto unsolved need has remained for an improved hydrodynamic bearing unit and seal which overcomes limitations including high prime cost and leakage/loss of lubricant.

SUMMARY OF THE INVENTION WITH OBJECTS

A general object of the present invention is to provide a leakage free and cost effective hydrodynamic bearing system overcoming limitations and drawbacks of the prior art.

Another object of the present invention is to provide an improved hydrodynamic bearing system for a disk spindle of a computer hard disk drive.

A more specific object of the present invention is to provide a hydrodynamic bearing unit having a configuration which effectively contains its lubricant inside the bearing unit under all operating and nonoperating conditions of a disk spindle and motor within a hard disk drive.

A further object of the present invention is to take advantage of centrifugal force generated by relative rotation of elements of a hydrodynamic bearing unit in order to provide an improved lubricant containment mechanism for containing the lubricant within the bearing.

Yet another object of the present invention is to provide a hydrodynamic bearing design employing a single thrust plate which enables an increased span between two journal bearings and concomitant angular stiffness of the bearing system.

One more object of the present invention is to provide a hydrodynamic bearing design which avoids use of flow passageways within the bearing unit and thereby reduces manufacturing difficulty and lowers cost.

In one example of the present invention, a hydrodynamic bearing unit includes a shaft and a sleeve rotatably disposed over the shaft. The sleeve and shaft cooperate to define a plurality of spaced-apart hydrodynamic journal bearings. An annular axial thrust plate is secured to the shaft to form a shaft subassembly and has a first radial surface in facing confrontation with a shoulder of the sleeve to define a first hydrodynamic thrust bearing. A thrust bushing is secured to the sleeve to form a sleeve subassembly and has a bearing surface in overlying facing engagement with a second radial surface of the annular axial thrust plate to form a second hydrodynamic thrust bearing. A primary seal for hydrodynamic lubricant is defined by an annular Vee groove formed by adjacently facing portions of the thrust bushing and the thrust bearing adjacent to the shaft. The Vee groove has a base facing the shaft and an apex converging toward the second hydrodynamic thrust bearing. The shaft may preferably include a radially-outwardly-extending step onto which the lower face of the thrust plate is registered, providing precise registration of the thrust plate and resulting in extra centrifugal force during rotation when the primary seal is occupied by lubricant. A motor, such as a DC brushless spindle motor rotates the sleeve subassembly relative to the shaft subassembly at a predetermined angular velocity. A hydrodynamic lubricant is loaded into the annular Vee groove as well as the hydrodynamic journal and thrust bearings. The lubricant is retained in place within the Vee groove seal by capillary force in the absence of rotation, and by centrifugal force in the presence of relative rotation between the subassemblies.

As a related feature of this example of the invention, a secondary seal is provided in addition to the primary lubricant seal. The secondary seal is formed by two oppositely facing frustoconical surfaces of the shaft and the thrust bushing which define a gap having a narrowed throat region adjacent to the primary seal and a divergent opening leading to the ambient. The narrowed throat region is located at a radius greater than a radius of the divergent opening to the ambient, so that centrifugal force guides droplets of lubricant back to the Vee groove seal. Barrier film may be coated onto opposite annular faces of the shaft and the thrust bushing defining an outer gap segment of the secondary seal.

As a further related feature of this example of the invention, the hydrodynamic bearing unit includes a disk hub secured to the shaft for supporting at least one data storage disk. Moreover, in this example, the DC brushless spindle motor has a stator of windings and magnetic gaps fixed relative to the shaft, and has a rotor comprising an annular magnet confronting the magnetic gaps which is secured to a ferromagnetic flux return ring fastened to an inside cylindrical wall of the disk hub.

As another related feature of this example of the invention, the hydrodynamic bearing unit includes a second seal adjacent to a journal bearing distant from the primary seal. The second seal is formed by two oppositely facing frustoconical surfaces of the shaft and the sleeve defining a gap having a narrowed throat region adjacent to the journal bearing distant from the first seal and has a divergent opening to ambient. The narrowed throat region is located at a radius greater than a radius of the divergent opening to the ambient, so that centrifugal force guides droplets of lubricant back to the second seal. Barrier film may be coated onto opposite annular faces of the shaft and the sleeve defining an outer gap segment of the second seal. The second seal may also include a Vee-shaped reservoir for hydrodynamic lubricant defined in the shaft and the sleeve between the narrowed throat region of the second seal and the journal bearing distant from the primary seal.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
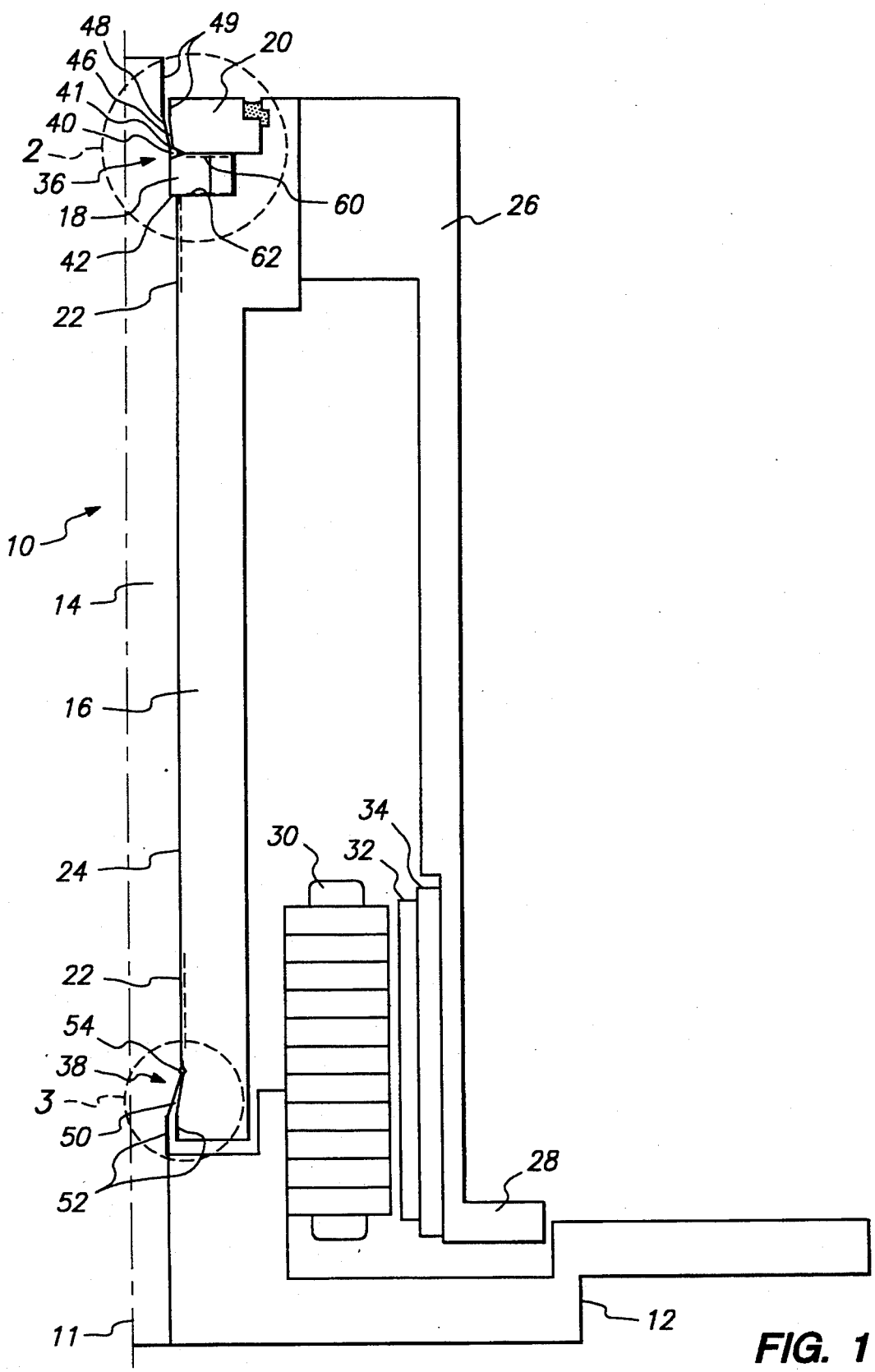
FIG. 1 is an enlarged, diagrammatic view in elevation and axial section of one side of a hard disk drive spindle assembly incorporating a hydrodynamic bearing unit in accordance with principles of the present invention.

With reference to FIG. 1, a hydrodynamic bearing unit 10 incorporating principles of the present invention includes a base 12 and a shaft 14 secured to the base 12 and extending upwardly therefrom in the orientation shown in FIG. 1. A rotating sleeve 16 fits snugly over the fixed shaft 14 with sufficient clearance between the shaft 14 and sleeve 16 to permit free relative rotation about a central axis of rotation 11. An annular thrust plate 18 is secured to the shaft 14 as by press-fitting or with a suitable adhesive. The thrust plate is seated against an annular shoulder 42 of the shaft 14 which defines a somewhat greater diameter below the; shoulder 42 than above it, as shown in the FIG. 1 view. The thrust plate 18 defines two annular faces lying in planes perpendicular to the central axis 11. A thrust bushing 20 is secured to the sleeve 16 with a suitable adhesive 44 and overlies the thrust plate 18 to complete the hydrodynamic bearing unit. A suitable lubricant may then be introduced into the bearing unit by conventional techniques, such as vacuum loading. The shaft 14 and thrust plate 18 may be formed of hardened, tempered steel alloy, while the sleeve 16 and thrust bushing 20 may be formed of bronze, for example.

A hollow cylindrical outer hub 26 is fitted over the sleeve 16 and supports one or more rotating data storage disks in a stacked arrangement extending upwardly from an integral lower flange 28. A spindle motor includes a fixed stator assembly 30, and a rotating annular magnet 32 closely facing outer pole faces of the stator assembly 30. An annular ferromagnetic ring 34 provides a flux return path to the alternating polar faces of the annular permanent magnet 32, and provides a magnetic shield to inhibit stray magnetic flux from the magnet 32 from reaching the data storage disks.

The cylinder 16 includes at least one journal bearing 22, and FIG. 1 shows two journal bearings 22, a lower one of which is directly adjacent to sealing region at a lower end of the cylinder 16, and the other one of which is directly adjacent to a lower surface of the thrust bearing 18. The journal bearings may be patterned by suitable machining techniques to define pumping grooves forming herringbone or other pumping patterns which are operative to pump hydrodynamic lubricant incident to rotation of the sleeve 16 about the shaft 14. The sleeve 16 forms a gap adjacent to the shaft 14 throughout an inner longitudinal region 24 in order to define and provide a lubricant reservoir for supplying lubricant to the two axial bearing regions 22 during operation of the hydrodynamic bearing unit.

The thrust plate 18 may be patterned by suitable machining techniques to define a pumping pattern, such as spiral grooves. The thrust bushing 20 is secured over the thrust plate 18 with sufficient clearance to permit free relative rotation between mating surfaces of the plate 18 and 20 forming an upper thrust bearing 60 and mating surfaces of the plate 18 and sleeve 16 forming a lower thrust bearing 62. The bearing surface clearances are selected to minimize axial runout while permitting free relative rotation.

The present hydrodynamic bearing system includes a top seal 36 and a bottom seal 38. Each seal advantageously employs centrifugal force present during relative rotation between the shaft 14 and sleeve 16 as well as capillary force in order to confine the bearing lubricant inside of the bearing system.

Figure 2:
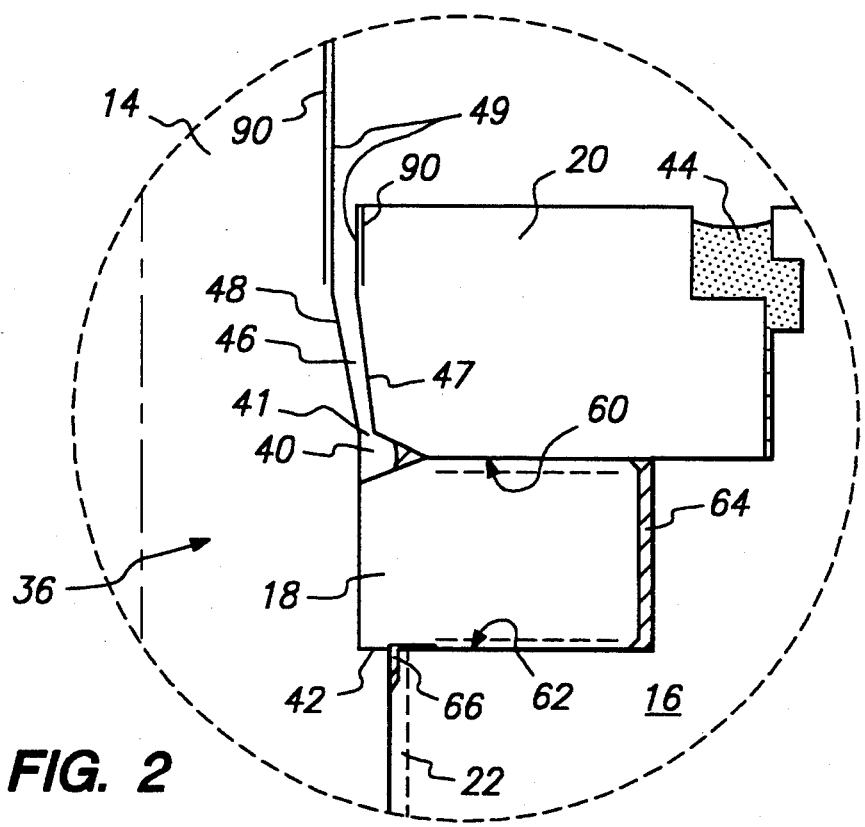
FIG. 2 is an enlargement of a portion of the FIG. 1 drawing at an upper lubricant seal region illustrating structural details thereof.

Turning now to FIG. 2, the top seal 36 includes a primary seal and a secondary seal. The primary seal is formed within a Vee-shaped gap 40 defined between mating faces of the thrust plate 18 and the thrust bushing 20 at a portion thereof radially inside of the upper thrust bearing 60. The thrust plate 18 and the thrust bushing 20 are preferably tapered prior to assembly to define angled regions defining the Vee-shaped gap 40 after bearing unit assembly. The Vee-shaped gap 40 has a base facing the shaft 14 and an apex converging toward the upper thrust bearing 60. The Vee-shaped gap 40 serves as a lubricant reservoir, and lubricant is maintained within the reservoir during non-operating intervals by surface tension (capillary force) and during operation by centrifugal force resulting from relative rotation between the shaft 14 and sleeve 16.

As shown in FIG. 2, the fixed shaft 14 has a step 42 onto which the lower face of the thrust plate 18 is registered. The presence of the step 42 makes the radial extent of the gap 40 longer at the upper thrust clearance than at the lower thrust clearance. As a result, when the Vee-shaped gap 40 forming the primary seal is occupied by lubricant, extra centrifugal force is present and tends to pump the lubricant toward the upper thrust bearing 60. During normal operation of the bearing unit, the lubricant occupies the Vee-shaped gap 40 for about one half of the length thereof extending from the apex, as shown in FIGS. 1 and 2.

A secondary seal is also provided outside of the primary sealing gap 40 by an annular diverging gap 46 defined by a frustoconical surface 48 of the shaft 14 and by an adjacently facing frustoconical surface 47 of the thrust bushing 20. In the sectional view of FIG. 2, the frustoconical surface 48 of the shaft 14 forms an acute angle with the axis of rotation 11 of approximately 11 degrees, while the frustoconical surface 47 of the thrust bushing 20 forms an acute angle with the axis of rotation 11 of approximately 5 degrees, thereby defining the annular diverging gap 46. The gap 46 converges in a radially outward direction toward the Vee-shaped gap 40, so that any lubricant escaping from the Vee-shaped gap 40 will be drawn back into the gap 40 by centrifugal force during rotation of the bushing 20 relative to the shaft 14. The shaft 14 and the bushing 20 define cylindrical walls 49 outwardly beyond the diverging gap 46, and these walls 49 may be coated with a suitable lubricant repelling agent or barrier film 90. The diverging gap 46 and the barrier film 90 will attract lubricant otherwise escaping from the primary seal 40, and the centrifugal force provided by the inwardly tapered frustoconical sections 48 and 47 will tend to drive the lubricant back to the area of the primary seal 40. The shaft section facing the Vee-shaped groove 40 may be of constant diameter or may be a continuation of the frustoconical region 48. The combination of the constant diameter (or tapered) shaft region, the bushing boundary 70 of the Vee-shaped groove 40, and the frustoconical region 47 of the bushing at the two sides of a primary seal opening 41 at the throat of the diverging gap 46 increases the contact angle of the lubricant at the opening 41 and inhibits lubricant from migrating outside of the primary seal 40.

A lubricant reservoir is defined in an annular space 64 between an endwall of the thrust plate 18 and a corresponding annular recess of the sleeve 16. A somewhat smaller annular space 66 is provided for lubricant just below the lower thrust bearing 62 at the vicinity of the shaft 14. The lubricant may be any suitable material. A hydrocarbon-based lubricating oil having a viscosity at room temperature of 20-30 centipoise (cp) is preferred.

Figure 3:
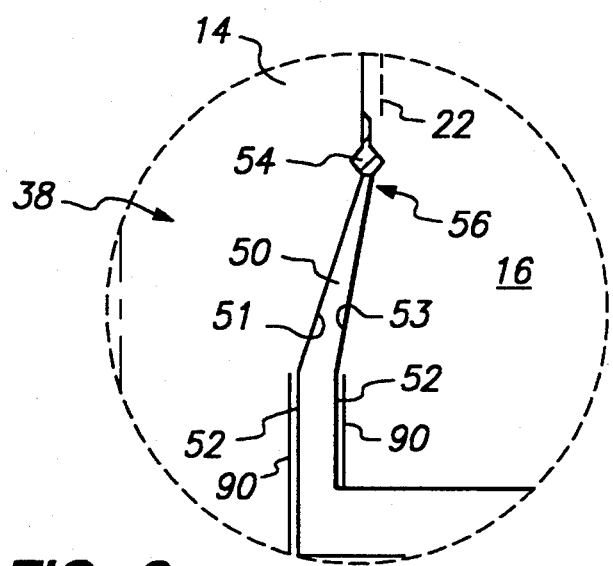
FIG. 3 is an enlargement of a portion of the FIG. 1 drawing at a lower lubricant seal region illustrating structural details thereof.

With reference to FIG. 3, the bottom lubricant seal 38 by a gap 50 defined by divergently facing frustoconical surfaces 51 and 53 of the shaft 14 and sleeve 16, respectively. For example, the surface 51 forms an angle with the axis of rotation 11 of approximately 18 degrees, while the surface 53 forms an angle with the axis of rotation 11 of approximately 9.5 degrees. As with the secondary seal of the upper seal 36, the divergent annular gap 50 has a throat region 56 lying immediately adjacent to an expansion region 54, such as a Vee-groove, containing lubricant and forming a lubricant reservoir. The throat region 56 is at a greater radius than a constant diameter region 52 at the divergent open end of the gap 50, so that centrifugal force resulting from rotation of the sleeve 16 relative to the fixed shaft 14 will tend to return lubricant to the reservoir region 54. During non-rotation intervals, capillary force maintains the lubricant within either the reservoir region 54 or the gap 50. The diverging gap 50 exerts both centrifugal and capillary forces on the lubricant in order to pump it back into the lower journal bearing 22. During normal operation the lubricating liquid film extends approximately half of the axial distance into the Vee-groove 54 if it is present, and otherwise extends to about half of the axial distance into the bottom seal gap 50 (if the Vee-groove reservoir 54 is not present). A barrier film 90 may be coated onto constant-radius surfaces 52 of the lower seal 38 in the same manner and for the same reason as obtains for the barrier film 90 used in the top seal 36. The barrier film 90 is selected to repel the lubricant material. Nyebar TM barrier film material is one suitable choice.

The top primary seal 40 provides an extra centrifugal force toward the outside diameter of the thrust plate 18 when the sealing area is occupied by lubricant during dynamic events such as a shock load, thermal expansion, or bearing start/stop operations. The extra space within the primary seal 40 is provided by the presence of the step 42 on the shaft 14 on which the thrust plate 18 is fitted. The increase of the contact angle provided by the taper sections on the shaft 14 and the thrust bushing 20 at the primary seal opening 41 prevents the lubricant from migrating out of the primary sealing area.

The top secondary seal attracts any splashed or wandering lubricant droplets by capillary force and by the presence of the barrier film, during static conditions, and drives the lubricant back to the primary seal gap 40 by rotation-induced centrifugal force and the inwardly tapered seal boundary surfaces 47 and 48.

The bottom seal which consists of a diverging gap 50 with inwardly tapered boundaries similarly prevents lubricant from escaping the bearing by inducing both capillary forces and centrifugal forces toward the lower journal bearing 22. When the Vee-groove 54 is provided, the lower lubricant surface will remain inside of the Vee-groove during normal operation. The increase in contact angle of the lubricant at the lower end of the Vee-groove 54 will discourage migration of the lubricant outside of the bearing structure.

While the foregoing description includes references to locations, such as top, upper, lower and bottom, etc., it should be understood that these references are given solely for consistency with the drawings. Those skilled in the art will appreciate that the principles of the present invention obtain and apply with equal force irrespective of the particular gravitational orientation of the illustrated spindle assembly. One apparent advantage of the present invention is that the surfaces defining the Vee-grooves 40 and 54, and divergent gaps 46 and 50 may be obtained with simple conventional machining operations, and that the presently preferred designs do not require formation of special pumping passages or other structural features otherwise required with prior approaches. The bearing unit may be readily assembled using conventional assembly techniques and achieves a low-cost, reliable solution for a self-lubricated, dual action radial and axial hydrodynamic bearing system manifesting superior retention of lubricant at rest, during operation, and in response to shock forces.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A hydrodynamic bearing unit comprising:
    a shaft,
    a sleeve rotatably disposed over the shaft and defining a pair of spaced-apart hydrodynamic journal bearings in cooperation with the shaft and defining an annular lubricant passageway between the pair of spaced-apart hydrodynamic journal bearings,
    an annular axial thrust plate secured to the shaft to form a shaft subassembly and having a first radial surface in facing confrontation with a shoulder of the sleeve and defining a first hydrodynamic thrust bearing,
    a thrust bushing secured to the sleeve to form a sleeve subassembly and having a bearing surface in overlying facing engagement with a second radial surface of the annular axial thrust plate and defining a second hydrodynamic thrust bearing,
    a first seal for hydrodynamic lubricant defined within an annular Vee groove defined by diverging annular wall surfaces of the annular axial thrust plate and the annular thrust bushing and located adjacent to the shaft and having an apex in substantial alignment with the second hydrodynamic thrust bearing,
    rotational force imparting means for rotating the sleeve subassembly relative to the shaft subassembly, and
    hydrodynamic lubricant emplaced within the annular Vee groove and being retained in place by capillary force in the absence of rotation, and being retained in place by capillary force and by centrifugal force in the presence of relative rotation between the shaft subassembly and the sleeve subassembly.

2. The hydrodynamic bearing unit set forth in claim 1 wherein the shaft defines a radial shoulder upon which the axial thrust plate is seated, the pair of spaced-apart hydrodynamic journal bearings being defined at a first radius of the shaft greater than a second radius of the shaft facing the annular Vee groove of the first seal, the annular Vee groove extending radially inwardly beyond the first radius relative to the shaft.

3. The hydrodynamic bearing unit set forth in claim 1 further comprising a secondary seal for the first seal and formed by two oppositely facing frustoconical surfaces of the shaft and the thrust bushing defining a gap having a narrowed throat region adjacent to the first seal and having a divergent opening to ambient, the narrowed throat region being located at a radius greater than a radius of the divergent opening to the ambient.

4. The hydrodynamic bearing unit set forth in claim 3 wherein the divergent opening to the ambient includes an outer gap segment defined by oppositely facing cylindrical surfaces of the shaft and the thrust bushing.

5. The hydrodynamic bearing unit set forth in claim 4 further comprising barrier film material coated on opposite annular faces of the shaft and the thrust bushing defining the outer gap segment.

6. The hydrodynamic bearing unit set forth in claim 1 further comprising a disk hub secured to the sleeve for supporting at least one data storage disk, and wherein the rotational force imparting means comprises a DC brushless spindle motor having a stator of windings and magnetic gaps fixed relative to the shaft, and having a rotor comprising an annular magnet confronting the magnetic gaps and secured to a ferromagnetic flux return ring in turn secured to an inside cylindrical wall of the disk hub.

7. The hydrodynamic bearing unit set forth in claim 1 further comprising a second seal adjacent to a hydrodynamic journal bearing distant from the first seal and formed by two oppositely facing frustoconical surfaces of the shaft and the sleeve defining a gap having a narrowed throat region adjacent to the hydrodynamic journal bearing distant from the first seal and having a divergent opening to ambient, the narrowed throat region being located at a radius greater than a radius of the divergent opening to the ambient.

8. The hydrodynamic bearing unit set forth in claim 7 comprising a Vee-shaped reservoir for hydrodynamic lubricant defined in the shaft and the sleeve between the narrowed throat region of the second seal and the journal bearing distant from the first seal.

9. The hydrodynamic bearing unit set forth in claim 8 wherein the divergent opening to ambient of the second seal includes an outer gap segment defined by oppositely facing cylindrical surfaces of the shaft and the sleeve.

10. The hydrodynamic bearing unit set forth in claim 9 wherein the outer gap segment of the second seal includes barrier film material coated on the oppositely facing cylindrical surfaces of the shaft and the sleeve.

11. A hydrodynamic bearing unit and lubricant seal comprising a shaft and a sleeve rotating relative to the shaft, the shaft and the sleeve defining a plurality of spaced apart hydrodynamic journal bearings, the shaft further defining a radial shoulder outwardly adjacent to one of the journal bearings and having a reduced cross-sectional dimension axially beyond the shoulder, a thrust plate secured to the shaft and registered by the radial shoulder and having a first radial surface in facing confrontation with a shoulder of the sleeve and defining a first hydrodynamic thrust bearing, a thrust bushing secured to the sleeve and having a bearing surface in overlying facing engagement with a second radial surface of the thrust plate and defining a second hydrodynamic thrust bearing, an annular Vee groove defined by diverging annular wall surfaces of the thrust plate and the thrust bearing and having a base facing the shaft outwardly adjacent to the radial shoulder and having an apex in substantial alignment with the second hydrodynamic thrust bearing, and hydrodynamic lubricant within the annular Vee groove which is retained in place by capillary force and by centrifugal force during relative rotation between the thrust plate and the thrust bushing.

12. A hydrodynamic spindle assembly for a hard disk drive spindle including a base, a shaft secured to the base, and a sleeve overlying the shaft and rotating relative to the shaft and base, the sleeve carrying a disk hub, the shaft and sleeve defining a plurality of spaced apart hydrodynamic journal bearings, a thrust plate secured to the shaft and having a first radial surface in facing confrontation with a shoulder of the sleeve and defining a first hydrodynamic thrust bearing, a thrust bushing secured to the sleeve and having a bearing surface in overlying facing engagement with a second radial surface of the thrust plate and defining a second hydrodynamic thrust bearing, a first lubricant seal axially beyond the thrust plate and formed by an annular Vee groove defined by diverging annular wall surfaces of the thrust plate and the thrust bearing and having a base facing the shaft and having an apex converging toward the second hydrodynamic thrust bearing, a second lubricant seal formed between the shaft and the sleeve at an axial location oppositely away from the first lubricant seal for retaining lubricant by capillary force and by centrifugal force, and lubricant emplaced within the first seal and the second seal and operative at the plurality of spaced apart hydrodynamic journal bearings and at the first and second thrust bearings.

13. The hydrodynamic spindle assembly set forth in claim 12, further comprising a DC brushless spindle motor having a stator coil assembly fixed to the base about the shaft, and having a rotating permanent magnet assembly secured to an inside annular wall of the hub.

14. The hydrodynamic spindle assembly set forth in claim 12 wherein the second seal is formed by two oppositely facing frustoconical surfaces of the shaft and the sleeve defining a gap having a narrowed throat region adjacent to a one of the journal bearings most distant from the first seal and having a divergent opening to ambient, the narrowed throat region being located at a radius greater than a radius of the divergent opening to the ambient.

15. The hydrodynamic spindle assembly set forth in claim 14 comprising a Vee-shaped reservoir for hydrodynamic lubricant defined in the shaft and the sleeve between the narrowed throat region of the second seal and the journal bearing distant from the first seal.

16. The hydrodynamic spindle assembly set forth in claim 15 wherein the divergent opening to ambient of the second seal includes an outer gap segment defined by oppositely facing cylindrical surfaces of the shaft and the sleeve.

17. The hydrodynamic spindle assembly set forth in claim 16 wherein the outer gap segment of the second seal includes barrier film material coated on the oppositely facing cylindrical surfaces of the shaft and the sleeve.

18. The hydrodynamic spindle assembly set forth in claim 12 wherein the shaft defines a radial shoulder upon which the axial thrust plate is seated, the plurality of spaced-apart hydrodynamic journal bearings being defined at a first radius of the shaft greater than a second radius of the shaft facing the annular Vee groove of the first seal.

19. The hydrodynamic spindle assembly set forth in claim 12 further comprising a secondary seal for the first seal and formed by two oppositely facing frustoconical surfaces of the shaft and the thrust bushing defining a gap having a narrowed throat region adjacent to the first seal and having a divergent opening to ambient, the narrowed throat region being located at a radius greater than a radius of the divergent opening to the ambient.

20. The hydrodynamic spindle assembly set forth in claim 19 wherein the divergent opening to the ambient includes an outer gap segment defined by oppositely facing cylindrical surfaces of the shaft and the thrust bushing, and further comprising barrier film material coated on opposite annular faces of the shaft and the thrust bushing defining the outer gap segment.

* * * * *